United States Patent
Kanthasamy et al.

(10) Patent No.: US 11,612,884 B2
(45) Date of Patent: Mar. 28, 2023

(54) PROCESS FOR PREPARING A HYDRO-TREATING CATALYST COMPOSITION FOR PRODUCING ULTRA-LOW SULFUR DIESEL

(71) Applicant: INDIAN OIL CORPORATION LIMITED, Maharashtra (IN)

(72) Inventors: Ramasubramanian Kanthasamy, Faridabad (IN); Kochappilly Ouseph Xavier, Faridabad (IN); Mani Karthikeyan, Faridabad (IN); Alex Cheru Pulikottil, Faridabad (IN); Madhusudan Sau, Faridabad (IN); Gurpreet Singh Kapur, Faridabad (IN); Sankara Sri Venkata Ramakumar, Faridabad (IN)

(73) Assignee: INDIAN OIL CORPORATION LIMITED, Mumbai (IN)

( * ) Notice: Subject to any disclaimer, the term of this patent is extended or adjusted under 35 U.S.C. 154(b) by 95 days.

(21) Appl. No.: 17/459,443

(22) Filed: Aug. 27, 2021

(65) Prior Publication Data
US 2022/0072526 A1 Mar. 10, 2022

(30) Foreign Application Priority Data
Sep. 9, 2020 (IN) .............................. 202021038934

(51) Int. Cl.
 *B01J 37/02* (2006.01)
 *B01J 6/00* (2006.01)
 (Continued)

(52) U.S. Cl.
 CPC ........... *B01J 37/0207* (2013.01); *B01J 6/001* (2013.01); *B01J 21/04* (2013.01); *B01J 23/882* (2013.01); *B01J 23/883* (2013.01); *B01J 35/0006* (2013.01); *B01J 37/0213* (2013.01); *C10G 29/16* (2013.01); *C10G 2300/1055* (2013.01);
 (Continued)

(58) Field of Classification Search
 CPC ........ B01J 6/001; B01J 21/04; B01J 35/0006; B01J 37/0203; B01J 37/0207; B01J 37/0213; B01J 37/882; B01J 37/883; C10G 29/16; C10G 45/08; C10G 2300/1055; C10G 2300/202; C10G 2400/04
 See application file for complete search history.

(56) References Cited

U.S. PATENT DOCUMENTS

| 4,012,340 A | 3/1977 | Morimoto |
| 9,987,622 B2 | 6/2018 | Nakajima et al. |

(Continued)

FOREIGN PATENT DOCUMENTS

WO  WO 2014/033653 * 3/2014 ............ B01J 37/02

*Primary Examiner* — Brian A McCaig
(74) *Attorney, Agent, or Firm* — Maschoff Brennan (57) ABSTRACT

A process for preparation of catalyst to produce ultra-low sulfur diesel (ULSD) from high refractory sulfur feedstock. The catalyst composition comprises a modified alumina carrier, impregnated by metal of group VIB is in the range of 15-25% and metal of group VIIIB is in the range of 1-5% as oxides. The catalyst prepared in the present invention produces highly dispersed MoS2 active sites on the modified carrier. The catalyst produces ultra low sulfur diesel (ULSD) along with improved cetane, density reduction and endpoint reduction.

15 Claims, 2 Drawing Sheets

(51) Int. Cl.
  *B01J 21/04* (2006.01)
  *B01J 23/882* (2006.01)
  *B01J 23/883* (2006.01)
  *B01J 35/00* (2006.01)
  *C10G 29/16* (2006.01)
(52) U.S. Cl.
  CPC ... *C10G 2300/202* (2013.01); *C10G 2400/04* (2013.01)

(56) References Cited

U.S. PATENT DOCUMENTS

| | | |
|---|---|---|
| 2012/0181219 A1 | 7/2012 | Seki et al. |
| 2018/0100107 A1 | 4/2018 | Alhooshani et al. |
| 2018/0187094 A1 | 7/2018 | Sunkara et al. |

* cited by examiner

PROCESS FOR PREPARING A HYDRO-TREATING CATALYST COMPOSITION FOR PRODUCING ULTRA-LOW SULFUR DIESEL

FIELD OF THE INVENTION

The present invention covers the process for preparing a high active catalyst composition, specifically active for hydro-treating of gas oil where in the catalyst composition contains hydro-desulfurization and hydrogenation activity required for preparing ultra low sulfur diesel (ULSD) from high refractory sulfur feedstock along with improved cetane, density reduction and endpoint reduction.

BACKGROUND OF THE INVENTION

Production of clean fuels at low cost is one of the major challenges faced by refiners globally. The last two decades have seen continuous development of hydro-treating catalyst technology in order to meet the regulations enforced worldwide on fuel quality particularly with regard to the sulfur content in diesel. Extensive research is being pursued globally to commercialize novel, cost-effective, highly active, and selective hydro-treating catalysts for producing ultra low sulfur diesel (ULSD). Accordingly, the new generation catalysts are designed with high active reaction sites, which can remove even the heavy sulfur compounds present in the feedstocks.

Hydro-treating of gas oils involves many simultaneous reactions like hydro-desulfurization, hydro-denitrogenation and hydro-dearomatization of distillates. Catalyst required for carrying out such wide range of reactions should be highly active containing better desulfurization and hydrogenation functions. In the case of desulfurization, the catalyst needs to be active in such a way that it can remove even the weakly reactive refractory species. Further, desulfurization of diesel streams below 10 ppm generally involves the removal of aromatic heterocyclic compounds like alkyl substituted benzothiophenes and dibenzothiophenes which are refractory in nature and difficult to remove. The reaction pathway for deep desulfurization of such refractory sulfur compounds to produce ULSD is through pre-hydrogenation followed by desulfurization as compared to the conventional direct C—S bond cleavage and this can be only achieved by employing a catalyst containing superior hydrogenation and desulfurization functions.

U.S. Pat. No. 9,987,622B2 describes hydro-desulfurization catalyst composition consisting of metals selected from Group VI, IX and X, along with phosphorus and an organic acid incorporated on a support containing Alumina and HY zeolite capable of reducing sulfur and nitrogen content in diesel oil. As per this prior art, use of HY zeolite having specific physical properties such as crystallite size results in better hydro-desulfurization reaction compared to other zeolites. In addition, it also discloses a method for hydro-treating of diesel oil using the hydro-desulfurization catalyst.

US2012/0181219 A1 relates to hydro-desulfurization catalyst for hydro-treating of hydrocarbon oil, in particular straight-run gas oil. The catalyst composition as per this prior art consists of at least one type of metal component selected from Groups VIA and VIII of periodic table supported on a silica-titania-alumina support. The composite support contains silica in the form of SiO2 in an amount of 1 to 10 wt %, titania in the form of TiO2 in an amount of 3 to 40 wt % and alumina in the form of Al2O3 in an amount of 50 to 96 wt % all on the support basis. As per this prior art, the silica-titania-alumina support having specific structure and specific properties significantly improved the desulfurization performance of the catalyst for the straight run hydrocarbon oil.

US2018/0187094 A1 discloses a metal particle coated nano-wire catalyst composition and a process for preparing the same for hydro-desulfurization of hydrocarbon streams. The catalyst consists of titanium (IV) oxide nano-wires that are prepared by exposing TiO2-KOH paste to microwave radiation and the metal particles selected from group consisting of nickel, cobalt, molybdenum, tungsten are impregnated on the titanium oxide nano-wire. The catalytically active metal particles are produced by sulfiding the metal impregnated nanowires and the resultant catalyst is employed for the removal of thiophenic sulfur from liquid fuels through hydro-desulfurization process in a fixed bed reactor.

US2018/0100107 A1 provides a single-pot method of producing a hydrodesulfurization catalyst through hydrothermal treatment of a silica source, a structural directing surfactant, an aqueous acid solution and metal precursors containing active catalyst materials. The support comprises of SBA-15 along with titanium where in the active catalyst materials are chosen from the group consisting of nickel, molybdenum, cobalt, and tungsten. As per this prior art, the catalyst composition prepared from the single-pot method exhibited a great potential to minimize the time involved in catalyst design and preparation and also resulted in superior catalytic performance and selectivity for direct desulfurization of dibenzothiophenes.

U.S. Pat. No. 4,012,340 discloses a method for preparing a hydrodesulfurization catalyst having fine pores distributed in the range of 50 to 200 Å by the addition of molybdate compound to aluminum complex having an anion selected from the group consisting of Cl, NO3, I, Br and ClO4 followed by addition of nickel or cobalt compound along with an additive chosen from the polyhydric alcohols, high molecular organic substances, and amine groups.

Unlike modified supports prepared in prior arts leading to pore blockage and deterioration in surface properties, support prepared as per the present invention leads to retention of physico-chemical properties thereby providing abundant surface for loading of metals during impregnation step leading to higher metal dispersion and hydrotreating activity. Further, the process of preparing metal solution using organic additives at specified pH results in generation of highly dispersed $MoS_2$ and Ni (Co)MoS active phases that are required for removal of highly refractive sulfur and nitrogen compounds present in the feedstock. Further, the synergy that exists between the modified support and metal precursors as per the process of the present invention aids in preparing a catalyst having controlled metal-support interaction that results in limiting the formation of undesired nickel-alumina and nickel sulfide phases that can otherwise decrease the hydrotreating activity of the catalyst.

Even though above cited references illustrate continuous refinement and development of methods for arriving at a high active hydrotreating catalyst through modification of support types, support structures, active metal components and their dispersion and loading, there is a continuous need for better and cost effective procedures with respect to support and metal components to develop high active hydrotreating catalysts for producing ultra low sulfur diesel. Further, modification of supports and metal components through methods as mentioned in the above prior arts mostly leads to deterioration of physico-chemical properties resulting in improper diffusion of feed/product molecules, increased coke formation leading to loss of activity and stability of the catalyst. Accordingly, the present invention provides a high active hydrotreating catalyst by a process that results in a support containing optimum surface properties required for structured dispersion of metal components over the support and also high active sites through modification of metal components by forming a selective metal complex in a controlled synthesis approach leading to effective removal of refractory Sulfur compounds leading to product containing <10 ppm sulfur.

SUMMARY OF THE PRESENT INVENTION

The present invention provides a process for preparing a hydro-treating catalyst composition with hydro-desulfurization and hydrogenation activity required for preparing ultra-low sulfur diesel (ULSD) from feedstock such as straight run gas oil (SRGO), light gas oil (LGO), heavy gas oil (HGO), coker gas oil (CGO) or mixtures containing above feed streams with at least 30% cracked feedstock containing refractory sulfur compounds.

The present invention provides a process for preparing a hydro-treating catalyst comprising of:
(i) preparing surface modified alumina support,
 a) peptizing alumina powder with an inorganic acid solution;
 b) extruding the material, drying and calcining the extrudates;
 c) impregnating the calcined extrudates with a solution of organic additive comprising an alcohol group to an extent of 1 to 20% wt of the total weight of the alumina support followed by ageing and drying to obtain surface modified alumina support;
(ii) preparing metal solution comprising metal selected from the group VIB and VIIIB of periodic table of elements
 d) preparing an impregnating solution of Group VIIIB metal compound and Group VIB metal or mixture thereof, molar ratio of organic additive containing one or more nitrogen atoms to Group VIIIB and Group VI metal in the range of 0.1-3.0;
 e) solution 1 is prepared using salt of molybdenum and amine group, wherein molar ratio of additive to molybdenum at 0.25-3.0;
 f) solution 2 is prepared using salt of nickel and amino poly carboxylic acid, wherein molar ratio of additive to nickel at 0.1-3.0; and
 g) mixing solution 1 and 2 and stirred vigorously to obtain impregnating solution.
(iii) impregnating the modified alumina support with the above metal precursor solution and drying at 100-140° C. for 8-16 hours to obtain catalyst.

wherein the modified alumina support obtained in step (i) (c) exhibits strong intermolecular O—H stretching bonds with characteristic infra-red peaks at 3500 cm−1, ~2875 cm−1, and ~1464 cm−1 and the DSC pattern of support has a prominent exothermic peak at 260° C.

In a feature of the present invention, the alumina powder is selected from the group boehmite alumina, pseudo-boehmite alumina, gamma alumina, alpha alumina, and mixtures thereof.

In a feature of the present invention, extrudates of step (b) are dried at 100-130° C. for 8-16 hours and calcinated in air at 450-600° C. for 1-5 hrs.

In a feature of the present invention, inorganic acid used for peptizing is selected from a group consisting of nitric acid, hydrochloric acid, formic acid, sulfuric acid, or a mixture thereof in a concentration range of 0.5-3 wt % of alumina powder.

In a feature of the present invention, organic additive of step (c) is selected from a group of glycol, glycerol, and sorbitol, in a range of 1 to 20% wt of the total weight of the carrier, preferably 5 to 10% wt.

In a feature of the present invention, metal of group VIB is in the range of 15-25% whereas the metal from group VIIIB is in the range of 1-5% as oxides of the total weight of the catalyst composition.

In a feature of the present invention, wherein the Group VIIIB metal is selected from Ni or Co and wherein the Group VIB metal is selected from Mo or W.

In a feature of the present invention, organic additive of step (e) is selected from amine group containing compounds such as ethylamine, ethanolamine, and ethylenediamine.

In a feature of the present invention, organic additive of step (f) is selected from amino poly carboxylic acid groups such as iminodiacetic acid (IDA), diethylene triamine penta acetic acid (DTPA), nitrilotriacetic acid (NTA) and ethylene diamine tetra acetic acid (EDTA).

In a feature of the present invention, pH of impregnating solution is in range of 0.2-3.0, preferably 0.2-0.9.

In a feature of the present invention, phosphoric acid may be added to impregnating solution.

Further, the present invention provides a modified alumina support catalyst to produce ultra-low sulfur diesel (ULSD) prepared by process comprising: i) 0.5-3% wt peptizing agent based on dry weight of alumina; ii) 5 to 10% wt organic additive of the alumina carrier; iii) 1.0-5.0 w % of nickel and/or cobalt as oxide based on the weight of oxide form of catalyst; iv) 15-25 w % of molybdenum as oxide based on the weight of oxide form of catalyst; v) 0.1-3 moles organic additive per moles of nickel and molybdenum; and vi) 0.25-3.0 moles amine compound per moles of molybdenum.

In a feature of the present invention, the catalyst reduces the sulfur content of diesel to less than 10 ppm.

Objectives of the Present Invention

The primary objective of the present is to provide a process for preparing a catalyst to produce ultra-low sulfur diesel (ULSD).

Another objective of the invention is to provide a catalyst composition suitable for producing diesel containing less than 10 ppm sulfur meeting stringent BS-VI/Euro-VI diesel specifications.

Another objective of the invention is to provide an enhanced hydro-treating activity for feedstock containing high refractory sulfur, nitrogen, and aromatics.

Yet another object of the present is to provide a catalyst which results in significant reduction in density and end point in addition to deep desulfurization and improved cetane properties.

DESCRIPTION OF THE INVENTION

According to the main embodiment, the present invention provides a process for preparing a hydro-treating catalyst with hydro-desulfurization and hydrogenation activity required for preparing ultra low sulfur diesel (ULSD) from feedstock such as straight run gas oil (SRGO), light gas oil (LGO), heavy gas oil (HGO), coker gas oil (CGO) or mixtures containing above feed streams with at least 30% cracked feedstock containing refractory sulfur compounds. The catalyst prepared as per the present invention also enables enhanced hydro-treating activity for feedstock containing high nitrogen and aromatics. Further, the catalyst prepared as per the present invention results in significant reduction in density and end point in addition to deep desulfurization and improved cetane properties.

In an embodiment the present invention relates to a process for preparing a high active hydro-treating catalyst comprising of:

(i) preparing a modified alumina support containing strong intermolecular O—H stretching bonds with characteristic infrared peaks at ~3500 cm$^{-1}$, ~2875 cm$^{-1}$, ~1464 cm$^{-1}$ and DSC peak at ~260° C. prepared by modifying the alumina surface with an alcohol group containing organic additive to an extent of 1 to 20% wt of the total weight of the carrier, more preferably 5 to 10% wt of the total weight of the carrier, the XRD pattern of which support is retained without any deterioration in crystalline structure along with the retention of physico-chemical properties; resulting support having superior surface properties for enabling enhanced dispersion of metal components over the carrier.

(ii) impregnating the support obtained in step (i) with metals of Group VIB and Group VIIIB of the periodic table of elements where an organic additive containing one or more nitrogen atoms connected to two or more carboxyl groups is complexed with the promoter and/or active metal keeping a molar ratio of organic additive to promoter metal in the range of 0.1-3.0.

(iii) maintaining the pH of the impregnating metal solution at a range of 0.2-3.0, more preferably in the range of 0.2-0.9 resulting in the creation of highly stable metal precursors required for generation of high active catalytic sites.

The synergy that exists between the surface modified support and metal precursors generated at specific pH range through complexation of organic additive with promoter and/or active metal leads to the formation of more number of active sites in nanometer range in addition to optimal metal-support interaction required for enhanced desulfurization activity of the catalyst.

In another embodiment, the modified gamma alumina acts as the support for preparing hydrotreating catalyst. Generally, alumina exists in different phases like boehmite, pseudo-boehmite, gamma and alpha and it is a well-known fact that gamma alumina is a good support for making hydrotreating catalyst. Gamma alumina can be obtained by calcination of boehmite or pseudo-boehmite alumina in the temperature range of 500-600° C. Physical properties such as surface area, pore size, pore volume and pore size distribution are some of the key parameters that determine the suitability of alumina for its usage as support for making hydrotreating catalyst. One of the major requirements for alumina to be used as support is its ability and suitability to disperse the metal components uniformly on the alumina surface. Therefore, the surface of alumina support needs to be efficient for enhanced adsorption of metal components and for this purpose, the surface modification of alumina support is being carried out as per the present invention.

In an embodiment of the present invention, pseudo-boehmite alumina powder with particular physico-chemical properties is chosen. The pseudo-boehmite alumina powder has a surface area of 300-350 m$^2$/g, pore volume of 0.6-0.8 cc/g with more than 70% pores in the range of 50-150 Å. The pseudo-boehmite alumina powder is peptized by mixing with a solution containing mineral acids like nitric acid, hydrochloric acid, formic acid, sulfuric acid, etc. The mixture is then extruded followed by drying and calcination. The resultant extrudates impregnated with a solution containing an organic additive comprising of an alcohol group to an extent of 1 to 20% wt of the total weight of the alumina carrier. This is followed by ageing and drying leading to the final support of the present invention.

Characterization of surface modified alumina support prepared as above was carried out by techniques such as Infra red spectroscopy (IR), Thermogravimetric analyzer (TGA), surface area analyzer and x-ray diffractometer (XRD). Information on stretching and bending vibrations of alcohol groups with surface of alumina support was studied by IR spectroscopy whereas thermal profile such as exothermic and endothermic reactions of modified alumina support was obtained from TGA. Physico-chemical properties such as surface area, pore size, average pore diameter and pore size distribution were calculated from surface area analyzer and the crystalline structure of modified alumina support was identified from XRD.

Hydrogenation-dehydrogenation function of the catalyst is provided by metals and in the present invention, metal components are selected from group VIB and group VIIIB of the periodic table as known in prior art. Metals such as molybdenum or tungsten, preferably molybdenum are selected from group VIB whereas group VIIIB metals consist of nickel or cobalt, preferably nickel. The source of molybdenum includes salts such as ammonium molybdate, molybdeum trioxide, sodium molybdate, molybdic acid, phosphomolybdic acid, etc whereas nickel salts are chosen from nickel nitrate, nickel sulfate, nickel carbonate, nickel acetate, nickel chloride, etc. The metal from group VIB is present in the range of 15-25% whereas the metal from group VIIIB is present in the range of 1-5% as oxides of the total weight of the catalyst composition. The metal from group VIIIB acts as promoter wherein they help in promoting the active site generation in the catalyst. The real catalytic reactions are carried out by the metal from group VIB.

In another embodiment the present invention provides that the catalytic activity is further enhanced by adding suitable additives in optimum proportion which forms complex with the metal salts and result in superior desulfurization function for removing even the most refractory sulfur compounds in the feedstock.

In another preferred embodiment the present invention, provides a method for modification of both Group VI B and Group VIIIB metal species in the solution phase by forming metal complexes with an organic additive containing one or more nitrogen atoms connected to two or more carboxyl groups. The organic additive is selected from amino poly carboxylic acid groups such as iminodiacetic acid (IDA), diethylenetriaminepentaacetic acid (DTPA), nitrilotriacetic acid (NTA) and ethylenediaminetetraacetic acid (EDTA) wherein the molar ratio of organic additive to Group VIIIB metal lies in the range of 0.1-3.0. Further, the final impregnating metal solution is prepared at a specific pH range of 0.2-3.0, more preferably in the range of 0.2-0.9 which leads to the formation of monomeric metal precursors in solution which eventually results in the formation of highly dispersed MoS2 active sites on the modified carrier. The nano sized NiMoS phases present in the sulfided catalyst, which act as active site, is responsible for the superior desulfurization activity of the catalyst.

IN another preferred embodiment of the present invention solution 1 and solution 2 are separately prepared and then mixing to obtain impregnation solution. Solution 1 is prepared from a salt of molybdenum from sources of ammonium molybdate, molybdeum trioxide, sodium molybdate, molybdic acid, phosphomolybdic acid, etc along with amine group containing compounds such as ethylamine, ethanolamine, and ethylenediamine maintaining a molar ratio of additive to molybdenum at 0.25-3.0. Solution 2 was prepared from a salt of nickel like nickel nitrate, nickel sulfate, nickel carbonate, nickel acetate, nickel chloride, etc along with aminopolycarboxylic acid group containing compounds such as iminodiacetic acid (IDA), diethylenetriaminepentaacetic acid (DTPA), nitrilotriacetic acid (NTA) and ethylenediaminetetraacetic acid (EDTA) maintaining a molar ratio of additive to nickel at 0.1-3.0. The two solutions are mixed together under vigorous stirring.

In another embodiment of the invention phosphoric acid can be added to the solution in order to enhance the stability of the final impregnation metal solution. The pH of the solution is maintained in the range of 0.2-3.0, more preferably in the range of 0.2-0.9 so that nano sized active sites are created which are desirable for desulfurizing even highly refractory sulfur compounds leading to the production of ultra low sulfur diesel. Volume of the solution is maintained in such a way that it was sufficient to fill the pore of support. The impregnation is carried out for 2 hours followed by drying at 100-130° C. for 8-16 hrs.

Fundamental insights on the surface catalyst structure and active site chemistry are deduced from characterization by transmission electron microscopy and x-ray photoelectron spectroscopy (XPS). TEM studies provided information on morphological parameters such as length of $MoS_2$ active site slabs and stacking degree whereas details such as electronic state of metal species, degree of metal support interaction and sulfidability of metal precursor were obtained from XPS studies. These superior morphological and electronic properties of the catalyst prepared as per the present invention arise because of the modification of support and metal function leading to enhance desulfurization activity of the catalyst resulting in the production of ULSD.

In another embodiment, the present invention provides a method for preparing a high active hydrotreating catalyst capable of producing ULSD comprising of surface modified alumina support containing excellent physico-chemical and surface properties required for enhance dispersion of active metal components on the surface of the support wherein the metals contain superior hydrogenation activity obtained by modification of both Group VIB and Group VIIIB metal species in the solution phase by forming a selective metal complex in a controlled synthesis approach leading to effective removal of refractory Sulfur compounds leading to product containing <10 ppm sulfur.

Example-1

The support as per the present invention is prepared by modifying the alumina surface with an alcohol group containing organic additive selected from a group of compounds such as glycol, glycerol and sorbitol additive to an extent of 1 to 20% wt of the total weight of the carrier, more preferably 5 to 10% wt of the total weight of the carrier. First, pseudo-boehmite alumina powder having a surface area of 300-350 $m^2$/g, pore volume of 0.6-0.8 cc/g with more than 70% pores in the range of 50-150 Å was made in to dough using an inorganic acid solution with a concentration of 0.5-3% wt of the total weight of the dried alumina powder. This was followed by extrusion and ageing. The extrudates were then dried at 100-130° C. for 8-16 hours followed by calcinations in air at 450-600° C. for 1-5 hrs. The resultant alumina extrudates were impregnated with a solution containing an organic additive comprising of an alcohol group to an extent of 1 to 20% wt of the total weight of the alumina carrier. After ageing for 1-4 hrs, the extrudates were then dried at 100-130° C. for 8-16 hours to obtain the final surface modified alumina support. The physico-chemical properties of modified and un-modified alumina support are given in Table-1. The BET surface area, pore diameter and pore volume of the modified gamma-alumina support is at par with the unmodified gamma alumina carrier, indicating that the modified alumina support results in retaining the surface properties required for higher dispersion of metal components over the support as compared to un-modified alumina support.

TABLE 1

Physico-chemical characteristics of un-modified vs. modified alumina support

| Properties | Parent alumina support | Surface modified alumina support |
|---|---|---|
| Crystalline phase | Gamma-alumina | Gamma-alumina |
| BET SA ($m^2$/g) | 220-230 | 220-230 |
| Pore volume ($cm^3$/g) | 0.6-0.7 | 0.6-0.7 |
| Mean pore diameter (Å) | 85-100 | 85-100 |

Figure 1:
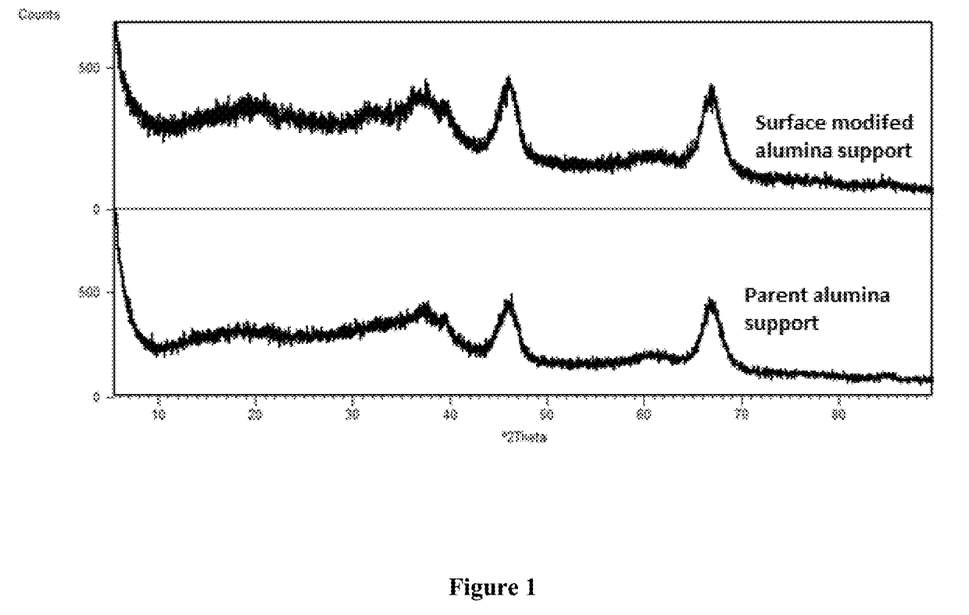
FIG. 1: depicts X-ray diffraction pattern of modified vs un-modified alumina support.

Further, the crystalline phase measured by x-ray diffraction (XRD) of the modified pseudo-boehmite alumina support is similar to the un-modified pseudo-boehmite alumina support as shown in FIG. 1 thus indicating that the crystal structure of the alumina support is unaltered even after surface modification by organic additive.

Figure 2:
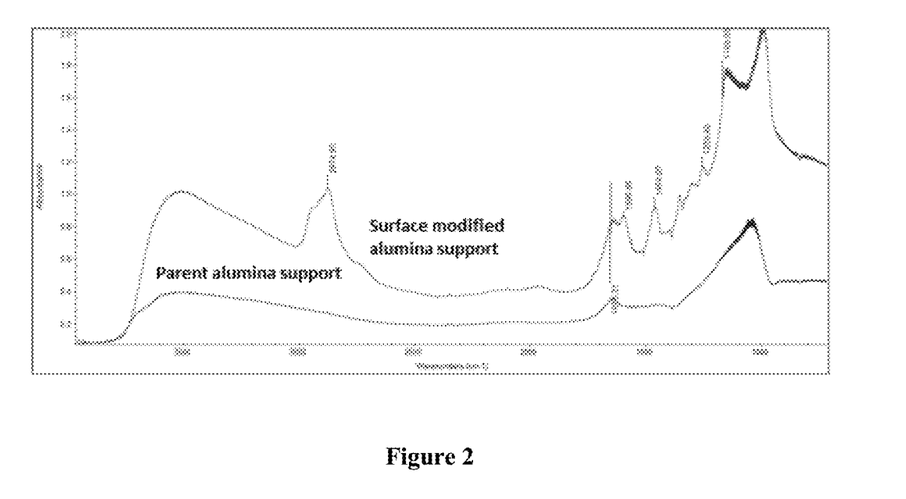
FIG. 2: depicts infrared spectroscopy of modified vs un-modified alumina support.
Figure 3:
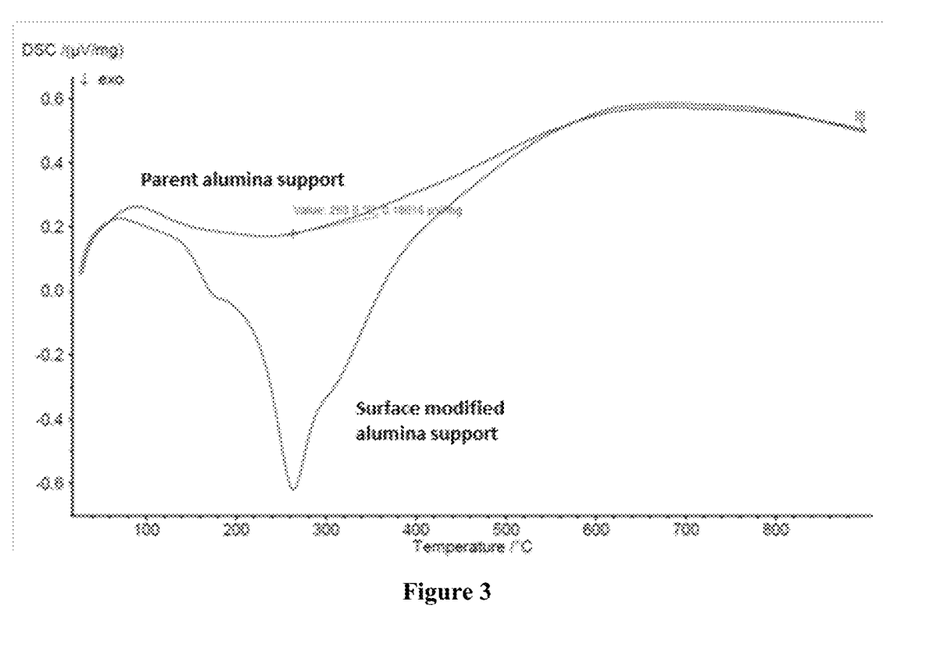
FIG. 3: depicts DSC pattern of modified vs un-modified alumina support.

FT-IR and TG-DSC tools were also used to characterize the modified alumina supports. FT-IR spectra shown in FIG. 2, which indicate that the modified alumina supports exhibits new stretching and bending bands when compared to un-modified alumina support. Prominent peaks were seen for surface modified alumina support at ~3600 $cm^{-1}$ related to strong intermolecular O—H stretching bond between alcohol and water groups of the alumina support, ~2800 $cm^{-1}$ attributed to strong C—H stretching alkane bond and weak broad O—H stretching bond and ~1464 $cm^{-1}$ related to C—H bending alkane bond. Differential scanning calorimetry (DSC) pattern of modified alumina support is compared against un-modified parent alumina support in FIG. 3. A strong exothermic peak is observed for surface modified alumina support at ~263° C. due to the presence of alcohol additive group.

Example-2

As per the present invention, the metal solution used for impregnation of the support is an aqueous solution of corresponding soluble metal salts selected from the group VIB and VIIIB of periodic table of elements. These metals are impregnated in to the porous structure of the alumina support through incipient wet impregnation method. Group VIB and Group VIIIB metals are present in the range of 15-25% and 1-5% as oxide out of total weight of catalyst, respectively. Group VIB metal can be molybdenum or tungsten, more specifically molybdenum whereas Group VIIIB metal can be nickel or cobalt, more specifically nickel. The resultant support as prepared above in EXAMPLE-1 is impregnated with metals of Group VIB and Group VIIIB of the periodic table of elements as its precursor solutions to a level of 15-25% and 1-5% as oxide out of total weight of catalyst, respectively. The source for nickel can be nickel chloride, nickel carbonate, nickel nitrate, nickel sulfate, nickel acetate, etc whereas the source for molybdenum can be molybdic acid, molybdenum trioxide, ammonium molybdate, potassium molybdate, sodium molybdate, etc. The organic additive containing one or more nitrogen atoms connected to two or more carboxyl groups is selected from aminopolycarboxylic acid groups such as iminodiacetic acid (IDA), diethylenetriaminepentaacetic acid (DTPA), nitrilotriacetic acid (NTA) and ethylenediaminetetraacetic acid (EDTA) In a typical experiment, nickel solution was prepared separately by reacting the nickel salt with the organic additive chosen from the group of above mentioned aminopolycarboxylic acid keeping the mole ratio of organic additive to nickel metal in the range of 0.1-3.0. This was followed by preparing a molybdenum solution separately by reacting the molybdenum source with amine compounds such as ethylamine, ethanolamine and ethylenediamine keeping the mole ratio of amine compound to molybdenum metal in the range of 0.25-3.0. Subsequently, molybdenum solution was slowly added to nickel solution to form the final NiMo metal solution. The pH of the final NiMo metal solution lies in the range of 0.2-3.0, more preferably in the range of 0.2-0.9. The metal solution was then impregnated over the support as prepared above based on the incipient wet impregnation method. The impregnated catalyst was then dried in air oven at 100-140° C. for 8-16 hours resulting in finished catalyst, CAT-A.

Example-3

CAT-B was prepared using the same support as mentioned in EXAMPLE-1 except that there were no organic additive containing one or more nitrogen atoms connected to two or more carboxyl groups added to the metal component selected from metals of the group VIB and VIIIB of the periodic table of elements as mentioned in EXAMPLE-2. In a typical experiment, nickel and molybdenum solutions were prepared separately without adding any organic additive. Subsequently, molybdenum solution was slowly added to nickel solution to form the final NiMo metal solution. The NiMo metal solution was then impregnated over the support as prepared above based on the incipient wet impregnation method. The impregnated catalyst was then dried in air oven at 100-140° C. for 8-16 hours resulting in finished catalyst, CAT-B.

Example-4

CAT-C was prepared using the same NiMo metal solution prepared at a specific pH range of 0.2-3.0, more preferably in the range of 0.2-0.9 where in the organic additive is complexed with promoter and/or active metal component as prepared in EXAMPLE-2 except that un-modified alumina was chosen as the carrier. In a typical experiment, pseudo boehmite alumina powder was made in to dough using an inorganic acid solution with a concentration of 0.5-3% wt of the total weight of the dried alumina powder. This was followed by extrusion and ageing. The extrudates were then dried at 100-130° C. for 8-16 hours followed by calcinations in air at 450-600° C. for 1-5 hrs. Subsequently, the NiMo metal solution as prepared in EXAMPLE-2 was then impregnated over the support as prepared above based on the incipient wet impregnation method. The impregnated catalyst was then dried in air oven at 100-140° C. for 8-16 hours resulting in finished catalyst, CAT-C.

Example-5

As a comparative example, CAT-D was prepared using un-modified alumina support and NiMo metal solution without any organic additive. In a typical experiment, pseudo boehmite alumina powder was made in to dough using an inorganic acid solution with a concentration of 0.5-3% wt of the total weight of the dried alumina powder. This was followed by extrusion and ageing. The extrudates were then dried at 100-130° C. for 8-16 hours followed by calcinations in air at 450-600° C. for 1-5 hours resulting in the final carrier. Nickel and molybdenum solutions were prepared separately without adding any organic additive. Subsequently, molybdenum solution was slowly added to nickel solution to form the final NiMo metal solution. The pH of the final NiMo metal solution lies in the range of 1.5-3. The NiMo metal solution was then impregnated over the support as prepared above based on the incipient wet impregnation method. The impregnated catalyst was then dried in air oven at 100-140° C. for 8-16 hours resulting in finished catalyst, CAT-D.

Example-6

Characterization of Catalysts by XPS

The degree of metal-support interactions and sulfidability of metal precursors are the most crucial parameters which determine the generation of active sites, its structure and intrinsic activity. High active sites possess lesser metal support interactions and more number of $MoS_2$/NiMoS phases. The generation of these high active sites is highly dependent upon the support and metal functionalities used for preparing the catalyst. XPS was used to quantify the presence of $MoO_3$, $MoS_2$ and MoOS phases of CAT-A, CAT-B and CAT-C. The $MoS_2$ and MoOS phases correspond to the sulfided species of molybdenum that were generated after sulfidation of the catalyst. The $MoS_2$ phase corresponds to the most active sites of the catalyst and more number of such active sites is required for higher performance of the catalyst. XPS data suggest that CAT-A posses more number of $MoS_2$ and NiMoS active phases on the surface of the catalyst when compared to CAT-B and CAT-C. Moreover, CAT-A contains less number of $MoO_3$ and MoOS phase as compared to CAT-B and CAT-C suggesting that the process used for preparing the catalyst as per present invention leads to superior sulfidability of the catalyst resulting in high catalytic activity. Further, CAT-A resulted in very less NiS and $NiAl_2O_4$ phases as compared to CAT-B and CAT-C implying that the catalyst prepared as per the present invention leads to low metal support interaction and less undesired nickel sulfide phase which again results in superior desulfurization activity. Thus, the higher activity of the catalyst (CAT-A) of the present invention can be attributed to the presence of low metal-support interaction, improved sulfidation behavior of metal species and formation of higher number of active sites generated by the synergistic effect between surface modified alumina support and metal complexes generated between the promoter and/or active metal with the organic additive.

After sulfidation, the three catalysts namely, CAT-A, CAT-B and CAT-B were examined using X-ray photoelectron spectroscopy (XPS). The quantity of $MoO_3$, $MoS_2$, MoOS and NiMoS phases of these catalysts were calculated by deconvolution of XPS data obtained. The $MoS_2$, MoOS and NiMoS phases correspond to the sulfided species of molybdenum that were generated after sulfidation of catalyst. The $MoS_2$ and NiMoS phases correspond to the most active sites of the catalyst and more number of such active sites is required for higher performance of the catalyst. The $MoS_2$ phase for CAT-A was estimated to be 100% whereas 60% and 80% were estimated for CAT-B and CAT-C, respectively. Similarly, higher quantity of NiMoS phase (90%) was exhibited by CAT-A when compared to CAT-B (50%) and CAT-C (75%). Further, CAT-A contained lower quantity of $MoO_3$ phase (8%) when compared to CAT-B (20%) and CAT-C (15%) showing that the process used for preparing the catalyst as per present invention leads to superior sulfidability of the catalyst resulting in high catalytic activity. Further, CAT-A resulted in very less NiS and $NiAl_2O_4$ phases as compared to CAT-B and CAT-C implying that the catalyst prepared as per the present invention leads to low metal support interaction and less undesired nickel sulfide phase which again results in superior desulfurization activity.

Example-7

Performance Evaluation of Catalysts

The catalysts were evaluated for diesel hydro-desulfurization activity using high refractory sulfur feed containing sulfur to an extent of 1.5 wt %. The properties of the feed used for performance evaluation of catalysts prepared as per above examples are given in Table 2.

TABLE 2

Properties of the feed
Feed properties

| Components | |
|---|---|
| SRGO (wt %) | 20-40 |
| Vac HSD (wt %) | 5-20 |
| LCGO (wt %) | 20-40 |
| LCO (wt %) | 20-40 |
| Feed sulfur (wt %) | 1-1.5 |
| Density (g/cc) | 0.8-0.9 |
| Cetane number | 40-45 |
| $T_{95}$ (° C.) | 360-380 |

The catalysts (CAT-A, B & C) prepared in the above examples were evaluated using micro reactors. 5 cc of catalyst was loaded into a reactor and dried in a flow of nitrogen at 150° C. Subsequently, the catalysts were pre-sulfided at 35 bar hydrogen pressure at 340° C. over a period of 18 hours using 2 wt % Dimethyldisulfide in light gas oil. Products were collected after stabilized operating conditions and analyzed for sulfur content after stripping of hydrogen sulfide from the product in a sulfur analyzer. Operating conditions and sulfur content in the product diesel for the three catalysts as prepared in above examples are given in Table 3.

TABLE 3

Operating conditions and hydro-desulfurization activity results

| | CAT-A | CAT-B | CAT-C | CAT-D |
|---|---|---|---|---|
| Operating conditions | | | | |
| Pressure (bar) | 50 | 50 | 50 | 50 |
| Temperature (Deg C.) | 360 | 360 | 360 | 360 |
| LHSV (hr−1) | 1.5 | 1.5 | 1.5 | 1.5 |
| Product properties | | | | |
| Sulfur (ppm) | 8 | 64 | 22 | 125 |

From Table 3, it is clearly evident that the CAT-A exhibits superior desulfurization activity when compared to CAT-B and CAT-C. Further, the products of CAT-A, CAT-B and CAT-C were analyzed for aromatics content using HPLC and the results indicated that CAT-A showed deep saturation of aromatics when compared to CAT-B and CAT-C. Additionally, CAT-A showed higher denitrogenation activity when compared to other catalysts in the examples. In addition to superior desulfurization activity, CAT-A also resulted in cetane jump of 10-12 units, endpoint reduction of 15-20 degree and density reduction of 40 kg/m³ implying the catalyst prepared as per present invention is completely suitable for producing ultra low sulfur diesel meeting all other stringent environmental specifications. The high activity of the catalyst of the present invention is attributed to the formation of more number of active sites in nanometer range in addition to optimal metal-support interaction generated through surface modification of alumina support in addition to modification of metal components by metal complexes generated between the promoter and/or active metal with the organic additive.

The invention claimed is:
1. A process for preparing a hydro-treating catalyst comprising:
(i) preparing surface modified alumina support,
   a) peptizing alumina powder with an inorganic acid solution;
   b) extruding the material, drying and calcining the extrudates;
   c) impregnating the calcined extrudates with a solution of organic additive comprising an alcohol group to an extent of 1 to 20% wt of the total weight of the alumina support followed by ageing and drying to obtain surface modified alumina support;
(ii) preparing metal solution comprising metal selected from the group VIB and VIIIB of periodic table of elements,
   d) preparing an impregnating solution of Group VIIIB metal compound and Group VIB metal or mixture thereof, molar ratio of organic additive containing one or more nitrogen atoms to Group VIIIB and Group VI metal in the range of 0.1-3.0;
   e) solution 1 is prepared using salt of molybdenum and amine group, wherein molar ratio of additive to molybdenum at 0.25-3.0;
   f) solution 2 is prepared using salt of nickel and amino poly carboxylic acid, wherein molar ratio of additive to nickel at 0.1-3.0; and
   g) mixing solutions 1 and 2 and stiring vigorously to obtain the impregnating solution;
(iii) impregnating the modified alumina support with the impregnating solution and drying at 100-140° C. for 8-16 hours to obtain the hydro-treating catalyst wherein the modified alumina support obtained in step (i) (c) exhibits strong intermolecular O—H stretching bonds with characteristic infra-red peaks at 3500 cm$^{-1}$, ~2875 cm$^{-1}$, and ~1464 cm$^{-1}$ and the DSC pattern of support has a prominent exothermic peak at 260° C.

2. The process as claimed in claim 1, wherein alumina powder is selected from the group boehmite alumina, pseudo-boehmite alumina, gamma alumina, alpha alumina, and mixtures thereof.

3. The process as claimed in claim 1, wherein extrudates of step b are dried at 100-130° C. for 8-16 hours and calcined in air at 450-600° C. for 1-5 hours.

4. The process as claimed in claim 1, wherein the inorganic acid used for peptizing is selected from a group consisting of nitric acid, hydrochloric acid, formic acid, sulfuric acid, or a mixture thereof in a concentration range of 0.5-3 wt % of alumina powder.

5. The process as claimed in claim 1, wherein the organic additive of step (c) is selected from glycol, glycerol, and sorbitol, in a range of 1 to 20 wt % of the total weight of the carrier.

6. The process as claimed in claim 5, wherein the organic additive of step (c) is selected from glycol, glycerol, and sorbitol, in a range of 5 to 10 wt %.

7. The process as claimed in claim 1, wherein metal of group VIB is in the range of 15-25% whereas the metal from group VIIIB is in the range of 1-5% as oxides of the total weight of the catalyst composition.

8. The process as claimed in claim 1, wherein the Group VIIIB metal is selected from Ni or Co and wherein the Group VIB metal is selected from Mo or W.

9. The process as claimed in claim 1, wherein the organic additive of step (e) is selected from ethylamine, ethanolamine, and ethylenediamine.

10. The process as claimed in claim 1, wherein the organic additive of step (f) is selected from iminodiacetic acid (IDA), diethylene triamine penta acetic acid (DTPA), nitrilotriacetic acid (NTA) and ethylene diamine tetra acetic acid (EDTA).

11. The process as claimed in claim 1, wherein the pH of the impregnation solution is in a range of 0.2-3.0.

12. The process as claimed in claim 11, wherein the pH of the impregnating solution is in a range of 0.2-0.9.

13. The process as claimed in claim 1, wherein phosphoric acid may be added to the impregnating solution.

14. A modified alumina support catalyst to produce ultra-low sulfur diesel (ULSD) prepared by the process of claim 1 comprising: i) 0.5-3% wt peptizing agent based on dry weight of alumina; ii) 5 to 10% wt organic additive of the alumina carrier; iii) 1.0-5.0 w % of nickel and/or cobalt as oxide based on the weight of oxide form of catalyst; iv) 15-25 w % of molybdenum as oxide based on the weight of oxide form of catalyst; v) 0.1-3 moles organic additive per moles of nickel and molybdenum; and vi) 0.25-3.0 moles amine compound per moles of molybdenum.

15. A process for the preparation of ultra-low sulfur diesel comprising: contacting either the catalyst prepared by the process of claim 1 or the catalyst of claim 14 with a feedstock comprising one or more of straight run gas oil (SRGO), light gas oil (LGO), heavy gas oil (HGO), and coker gas oil (CGO) to produce a diesel with a sulfur content less than 10 ppm.

* * * * *